(12) United States Patent
Johannsen

(10) Patent No.: US 9,346,501 B2
(45) Date of Patent: May 24, 2016

(54) ELLIPTICAL BORE PIN RETENTION SYSTEM

(71) Applicant: Caterpillar Inc., Peoria, IL (US)

(72) Inventor: Eric J. Johannsen, Washington, IL (US)

(73) Assignee: Caterpillar Inc., Peoria, IL (US)

( * ) Notice: Subject to any disclaimer, the term of this patent is extended or adjusted under 35 U.S.C. 154(b) by 73 days.

(21) Appl. No.: 14/276,887

(22) Filed: May 13, 2014

(65) Prior Publication Data

US 2015/0329156 A1    Nov. 19, 2015

(51) Int. Cl.
*B62D 55/21* (2006.01)

(52) U.S. Cl.
CPC ..................... *B62D 55/21* (2013.01)

(58) Field of Classification Search
CPC ..... B62D 55/21; B62D 55/213; B62D 55/211
USPC ........................................... 305/202
See application file for complete search history.

(56) References Cited

U.S. PATENT DOCUMENTS

| | | | |
|---|---|---|---|
| 1,684,918 A * | 9/1928 | Jereczek | B62D 55/205 305/59 |
| 1,983,548 A | 12/1934 | Knox et al. | |
| 3,313,578 A * | 4/1967 | Wright | B62D 55/0887 305/201 |
| 3,958,836 A * | 5/1976 | Brown | B62D 55/092 305/118 |
| 4,083,611 A | 4/1978 | Schaffner et al. | |
| 4,120,537 A * | 10/1978 | Roley | B62D 55/28 305/118 |
| 4,129,045 A | 12/1978 | Kishitani | |
| 4,163,589 A | 8/1979 | Fox et al. | |
| 4,277,199 A | 7/1981 | Livesay | |
| 4,438,981 A * | 3/1984 | Harms | B62D 55/092 184/105.3 |
| 5,685,548 A | 11/1997 | Casemir et al. | |
| 6,109,706 A * | 8/2000 | Oertley | B62D 55/092 305/202 |
| 6,206,491 B1 * | 3/2001 | Hisamatsu | B62D 55/088 305/103 |
| 6,564,539 B2 * | 5/2003 | Bedford | B21K 25/00 29/517 |
| 7,354,200 B2 * | 4/2008 | Yamamoto | B62D 55/15 305/202 |
| 7,850,256 B2 * | 12/2010 | Mulligan | B62D 55/21 305/104 |

(Continued)

FOREIGN PATENT DOCUMENTS

| | | |
|---|---|---|
| GB | 569508 | 5/1945 |
| JP | 07-117737 A | 5/1995 |

(Continued)

OTHER PUBLICATIONS

Caldwell, *Mountain Bike Camping and Bikepacking Guide*, Old Glory MTB, downloaded from http://oldglorymtb.com/mountain-bike-camping-and-bikepacking-guide/ on May 13, 2014, 23 pp.

*Primary Examiner* — Jeffrey J Restifo

(74) *Attorney, Agent, or Firm* — Leydig, Voit & Mayer, Ltd.

(57) ABSTRACT

A machine tread including a first and second pair of plates. The plates have corresponding first ends and second ends, and the second ends of the first pair include elliptical bores with elliptical plate bearing surfaces. The first ends of the second pair include aligned bushing bores. The first ends of the second pair fit between the second ends of the first pair. Ends of a bushing including an inner bore with an interior surface and a cylindrical bearing surface engage the bushing bores forming a pin bore through the inner and elliptical bores. A retention pin fits in the segmented pin bore. The first pair has a tensioned position when a force acts in a direction away from the second pair. In the tensioned position, the elliptical plate bearing surfaces and the interior bushing surface abut the cylindrical bearing surface.

17 Claims, 14 Drawing Sheets

(56) References Cited

U.S. PATENT DOCUMENTS

| | | |
|---|---|---|
| 8,336,970 B2 | 12/2012 | Johannsen et al. |
| 8,991,944 B2 * | 3/2015 | Hisamatsu ......... B62D 55/0887 305/104 |
| 2003/0219181 A1 * | 11/2003 | Yamamoto ............ B62D 55/15 384/322 |
| 2005/0040708 A1 * | 2/2005 | Yamamoto ............ B62D 55/21 305/202 |
| 2008/0265667 A1 | 10/2008 | Livesay |
| 2010/0069188 A1 * | 3/2010 | Adachi ................ B62D 55/096 474/213 |
| 2011/0198917 A1 * | 8/2011 | Mulligan ............... B62D 55/21 305/201 |
| 2012/0019055 A1 * | 1/2012 | Giusti .................. B62D 55/088 305/106 |
| 2013/0169034 A1 | 7/2013 | Hisamatsu |
| 2015/0061374 A1 * | 3/2015 | Diekevers ............. B62D 55/21 305/202 |

FOREIGN PATENT DOCUMENTS

| | | |
|---|---|---|
| KR | 2008-0038632 A | 5/2008 |
| WO | WO 2013/175667 A1 | 11/2013 |

* cited by examiner

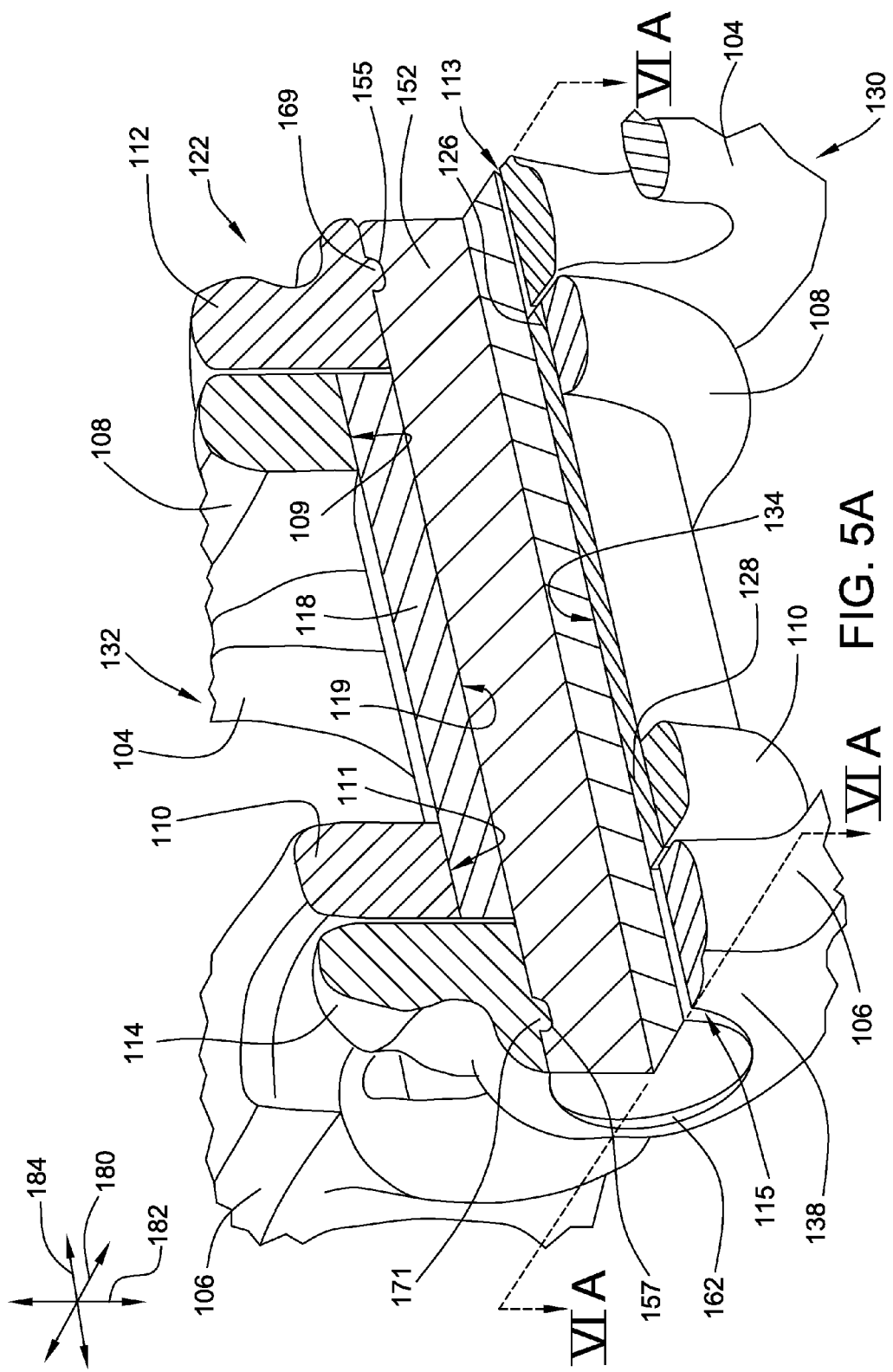

ELLIPTICAL BORE PIN RETENTION SYSTEM

TECHNICAL FIELD

This patent disclosure relates generally to retention systems and, more particularly, to systems for retaining pins on wheels, treads, tracks, or other equipment used with mining and construction machinery.

BACKGROUND

Various types of mining and construction machines, such as tractors, bulldozers, backhoes, excavators, motor graders, and mining trucks, commonly use track-type treads to move the machine. The track treads are generally constructed of modular plates made from steel, rubber, or other suitable materials, forming adjacent links joined to form a continuous band or tread. The continuous band of linkages is then driven by two or more wheels to move the machine.

Adjacent tread links are commonly joined to one another with a pivoting connection that allows each plate to pivot with respect to adjacent links. Cylindrical pins are often used to create this pivotal connection between adjacent links. Because machines having track-type treads are often used under rugged conditions, such as on construction sites, mines, and excavations, the links and the retaining system used to secure the pins to the links are subject to wear from abrasions, repeated impact, and other sources. Due to these rough operating conditions, it may become necessary to remove one or more pins connecting adjacent links to allow for repairs while in the field or elsewhere. A pin retention system that can be easily and quickly installed and removed in the field decreases machine downtime and results in higher work efficiency.

An improved, durable pin retention system is needed that increases useful life of the retention system's parts while allowing for easy removal and installation in the field.

The inventors have created this background description to aid the reader and not to indicate that any of the indicated problems were themselves appreciated in the art. While the principles described in the disclosure can, in some respects and embodiments, alleviate the problems inherent in other systems, the scope of the invention is defined by the attached claims, and not by the ability of any disclosed feature to solve any specific problem noted herein.

SUMMARY

In an embodiment, the present disclosure describes a machine with a continuous tread. The machine includes first pair of plates in spaced relation to one another and each aligned substantially parallel to a longitudinal axis. The plates have corresponding first ends and second ends. The second ends include coaxially aligned elliptical pin bores and have elliptical plate bearing surfaces surrounding the elliptical pin bores. The elliptical pin bores each have a major diameter that is greater than a minor diameter. The major diameter is aligned substantially parallel to the longitudinal axis. The machine includes a second pair of plates in spaced relation to one another. The plates have corresponding first and second ends. The first ends include coaxially aligned bushing bores. The second pair of plates is disposed adjacent the first pair of plates such that the first ends of the second pair of plates are disposed between the second ends of the first pair of plates. The machine includes a tubular bushing including an inner pin bore between opposite ends of the tubular bushing and has an interior bushing surface surrounding the inner pin bore. The ends of the bushing are disposed in the bushing bores of the first end of the second pair of plates to form a segmented pin bore through the inner pin bore and the elliptical pin bores. The machine includes a retention pin disposed in the segmented pin bore to pivotally connect the first pair of plates to the second pair of plates. The retention pin has a cylindrical bearing surface and has a retention pin diameter that is less than the major diameter of the elliptical pin bore. The first pair of plates has a tensioned position when a force acts upon the first pair of plates along the longitudinal axis in a direction away from the second pair of plates. The elliptical plate bearing surfaces are disposed in abutting relation with end portions of the cylindrical bearing surface when the first pair of plates is in the tensioned position, and the interior bushing surface is in abutting relation with a body portion of the cylindrical bearing surface when the first pair of plates is in the tensioned position.

In another embodiment, the present disclosure describes a machine with a continuous tread. The machine includes a first link including a first pair of plates in spaced relation to one another and each aligned substantially parallel to a longitudinal axis. The first pair of plates has corresponding first ends and second ends. The second ends include coaxially aligned elliptical pin bores surrounded by elliptical plate bearing surfaces, and at least one of the elliptical plate bearing surfaces includes a plate protrusion. The machine includes a second link including a second pair of plates in spaced relation to one another. The second pair of plates have corresponding first and second ends. The first ends include coaxially aligned bushing bores. The second link is disposed adjacent the first link such that the first ends of the second link are disposed between the second ends of the first link. The machine includes a tubular bushing including an inner pin bore between opposite ends of the tubular bushing. The ends of the bushing are disposed in the bushing bores of the first ends of the second link to form a segmented pin bore through the inner pin bore and the elliptical pin bores. The machine includes a retention pin disposed in the segmented pin bore to pivotally connect the first link to the second link. The retention pin has a cylindrical bearing surface that includes a pin depression. The first and second links have a tensioned position when a force acts upon the first link along the longitudinal axis in a direction away from the second link. In the tensioned position, the elliptical pin bores are not coaxially aligned with the inner pin bore and the plate protrusion and the pin depression are in engaged relation so as to limit axial movement of the retention pin relative to the first and second links. The first and second links also have a relaxed position when no force acts upon the first link in a direction away from the second link. In the relaxed position, the elliptical pin bores are coaxially aligned with the inner pin bore and the plate protrusion is disengaged from the pin depression.

In another embodiment, the present disclosure describes a continuous tread for a machine. The tread comprises a first pair of plates in spaced relation to one another and each aligned substantially parallel to a longitudinal axis. The plates have corresponding first ends and second ends. The second ends include coaxially aligned elliptical pin bores and have elliptical plate bearing surfaces surrounding the elliptical pin bores. The elliptical pin bores each have a major diameter that is greater than a minor diameter, and the major diameter is aligned substantially parallel to the longitudinal axis. The tread includes a second pair of plates in spaced relation to one another that have corresponding first and second ends. The first ends include coaxially aligned bushing bores. The second pair of plates is disposed adjacent the first pair of plates such that the first ends of the second pair of plates are disposed between the second ends of the first pair of plates. The tread includes a tubular bushing that includes an inner pin bore between opposite ends of the tubular bushing and that has an interior bushing surface surrounding the inner pin bore. The ends of the bushing are disposed in the bushing bores of the first end of the second pair of plates to form a segmented pin bore through the inner pin bore and the elliptical pin bores. The tread also includes a retention pin disposed in the segmented pin bore so as to pivotally connect the first and second pair of plates. The retention pin has a cylindrical bearing surface and a retention pin diameter that is less than the major diameter of the elliptical pin bore. The retention pin has a pin depression in the cylindrical bearing surface. The continuous tread has a tensioned position in which the elliptical plate bearing surfaces press against end portions of the cylindrical bearing surface in a first direction along the longitudinal axis, the interior bushing surface press against a body portion of the cylindrical bearing surface in a second direction opposite the first direction, and a plate protrusion on at least one of the elliptical plate bearing surfaces engages the pin depression in the cylindrical bearing surface so as to limit axial movement of the retention pin relative to the first and second pair of links. The continuous tread has a relaxed position in which the plate protrusion is disengaged from the pin depression in the cylindrical bearing surface to permit removal of the retention pin from the segmented pin bore.

BRIEF DESCRIPTION OF THE DRAWINGS

FIG. 5A is a partial sectional perspective view of the linkage joint of FIG. 4 in a relaxed position.

DETAILED DESCRIPTION

Figure 1:
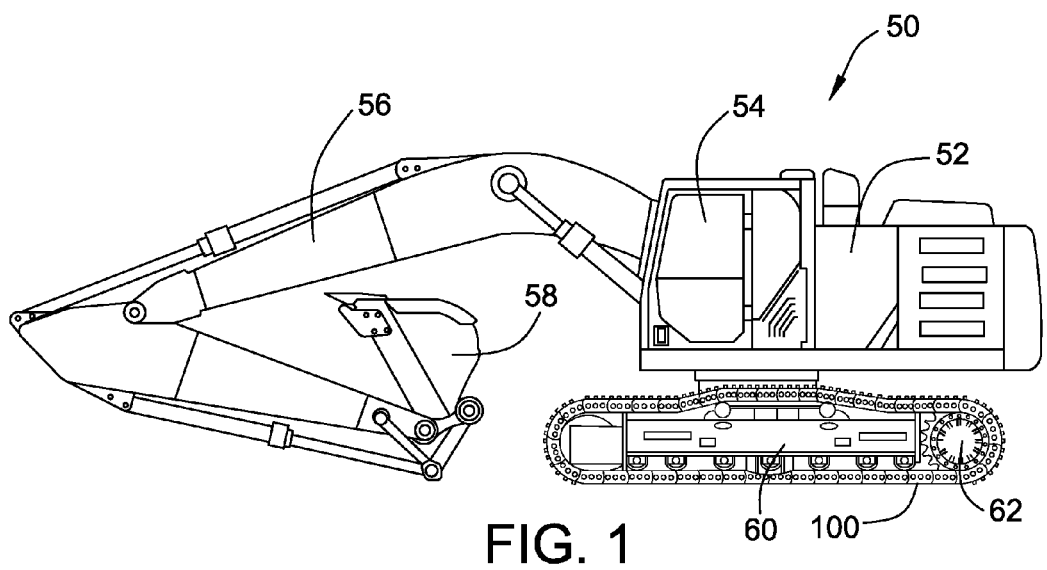
FIG. 1 is a side view of a machine featuring a track-type continuous tread with links utilizing a retention system in accordance with the disclosure.

This disclosure relates to retention systems for continuous tread linkages, specifically pin retention systems, utilized in various types of tractors, bulldozers, backhoes, excavators, motor graders, mining trucks, and other construction machinery. FIG. 1 shows an embodiment of a machine 50 in the form of a hydraulic excavator that can include an embodiment of a continuous tread 100 utilizing a retention system 150 constructed in accordance with principles of the present disclosure. Among other uses, hydraulic excavator can be used to dig trenches, handle materials, demolition, and in various surface mining or other construction applications. As shown, the machine 50 includes a body 52 with a cab 54 to house a machine operator. The machine includes a boom system 56 connected to the body 52 on one end and an implement 58 on the opposite end. The machine also has a chassis 60 connected to the body 52. The chassis 60 has at least two wheels 62 that drive a continuous tread 100, propelling the machine 50 in response to controls manipulated by the machine operator.

Figure 2:
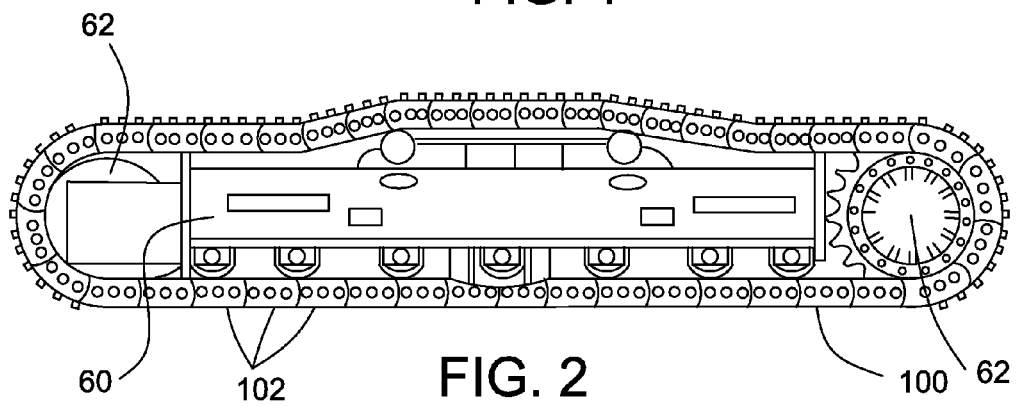
FIG. 2 is a side view of a machine chassis having a continuous tread with links utilizing a retention system in accordance with the disclosure.
Figure 3:
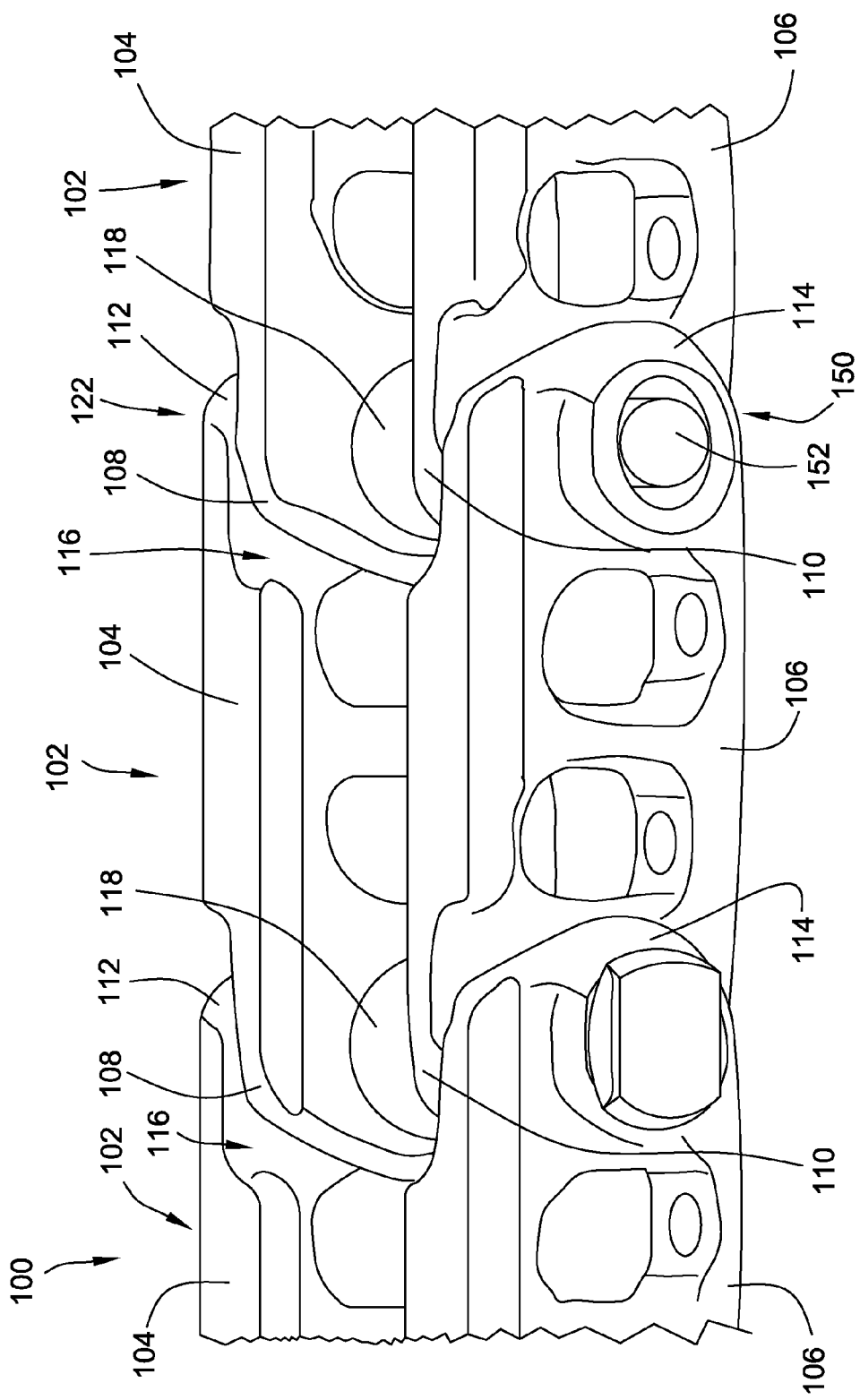
FIG. 3 is a partial perspective view of a continuous tread with a linkage joint utilizing a retention system in accordance with the disclosure.

FIG. 2 shows an enlarged side view of the chassis 60 equipped with the continuous tread 100. The continuous tread 100 can be made up of a plurality of adjacent links 102 pivotally connected to one another to create a continuous loop. As shown in FIG. 3, each link 102 can include a pair of plates 104, 106 in spaced relation to one another and a bushing 118 connecting the pair of plates. Each plate 104, 106 can have corresponding first ends 108, 110 and second ends 112, 114, where the first ends and second ends are opposite one another on each plate. The first ends 108, 110 are substantially aligned with one another, and the second ends 112, 114 are substantially aligned with one another. In the embodiment illustrated in FIG. 3, the bushing 118 spans the space between each pair of plates 104, 106, connecting the corresponding first ends 108, 110 of each link 102. In some embodiments, the bushing 118 can be either a separate part from the link 102 or integral with the link.

In certain embodiments, such as the embodiment illustrated in FIG. 3, the first ends 108, 110 can be offset from the second ends 112, 114 such that the first ends are nearer to one another than the second ends. The offset plate geometry in such embodiments can form cutouts 116 between corresponding second ends 112, 114 into which the first ends 108, 110 of an adjacent link 102 can fit. As assembled, pairs of plates 104, 106 from adjacent links 102 in the continuous tread 100 can be disposed adjacent one another such that the first ends 108, 110 of a link substantially align with the second ends 112, 114 of an adjacent link, forming a linkage joint 122 between the two adjacent links. A retention pin 152 for a retention system 150 can pass through the linkage joint 122 and pivotally connect the adjacent links to one another. In such embodiments, the retention pin 152 can pass through the first ends 108, 110 and the bushing 118 of a link and the second ends 112, 114 of an adjacent link.

FIG. 3 illustrates a linkage joint 122 showing part of the retention system 150. The retention system 150 is adapted to removably secure the retention pin 152 within the linkage joints 122 and, thus, removably secure adjacent links 102 to one another in a pivoting manner. While the embodiment illustrated in FIG. 3 shows a single retention system 150 used to secure one linkage joint 122, other embodiments of the continuous tread 100 can use any number of retention systems 150 on any number of linkage joints 122 between adjacent links 102. In some embodiments of the continuous tread 100, a single retention system 150 can be used on a single linkage joint 122. In such an embodiment, the remainder of the linkage joints 122 in the continuous tread 100 can be connected using other connecting systems, either presently known or later developed. In such embodiments, removal of the single retention pin 152 can break continuity of the continuous tread 100, allowing removal of the tread from the chassis 60 for repair or other purposes. In other embodiments, any additional number of retention systems can be used on the plurality of linkage joints 122 in the continuous tread 100.

Figure 4:
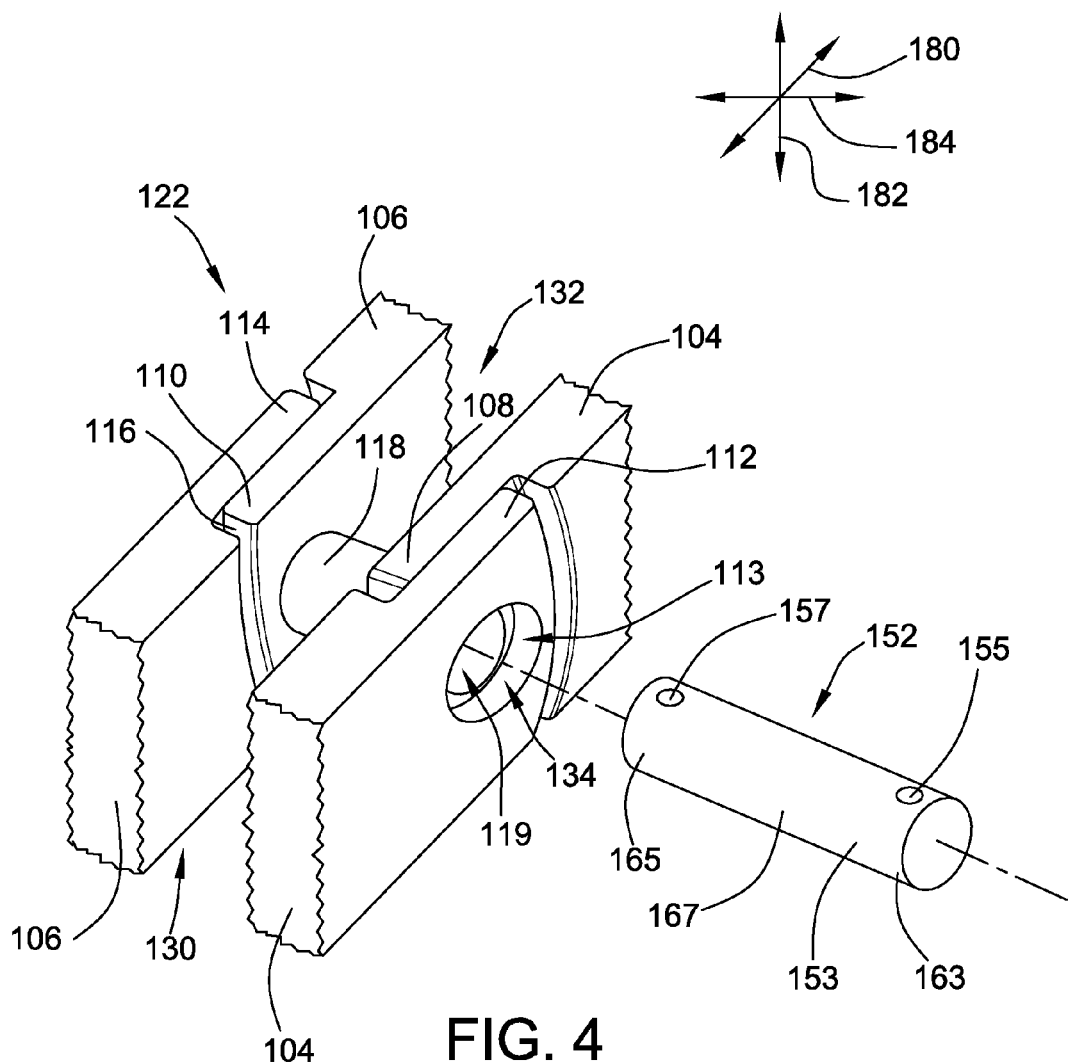
FIG. 4 is a partially exploded view of a linkage joint of a continuous tread utilizing a retention system in accordance with the disclosure.

FIG. 4 shows a partially exploded view of the linkage joint 122 between two adjacent links, a first link 130 and a second link 132, each of the first and second link having similar construction to and like reference numerals as the plurality of links 102 described above in reference to FIG. 3, and as will be further described.

In the illustrated embodiment, the first link 130 and the second link 132 each have a pair of plates 104, 106. The pair of plates 104, 106 are both in spaced relation to one another and each aligned substantially parallel to a longitudinal axis 180. The longitudinal axis 180 is defined perpendicular to both a lateral axis 184 and a radial axis 182. FIG. 4 illustrates the first ends 108, 110 of the second link 132 and the second ends 112, 114 of the first link 130. The first ends 108, 110 of the second link 132 can be connected by the tubular bushing 118, which can be aligned substantially with the lateral axis 184. The second ends 112, 114 of the first link 130 form the cutout 116 into which the first ends 108, 110 and the tubular bushing 118 of the second link 132 are disposed. The tubular bushing 118 can include an inner pin bore 119 between opposite ends 126, 128 of the bushing. The second ends 112, 114 of the first link 130 can each include an elliptical pin bore 113, 115 through the respective plates 104, 106. Each of the elliptical pin bores 113, 115 can be coaxially aligned with one another across the cutout 116. The first and second links 130, 132 can be disposed adjacent one another such that the elliptical pin bores 113, 115 substantially align with the inner pin bore 119 to form a segmented pin bore 134 through the linkage joint 122.

The retention pin 152 can have a cylindrical bearing surface 153 and pin depressions 155, 157 in the cylindrical bearing surface on either end of the retention pin. The pin depressions 155, 157 can extend from the cylindrical bearing surface partially into the retention pin 152. In some embodiments, the cylindrical bearing surface 153 of the retention pin 152 can be a smooth surface. The cylindrical bearing surface 153 can have end portions 163, 165 adjacent either end of the retention pin 152. The cylindrical bearing surface 153 can also have a body portion 167 between the two end portions 163, 165. The retention pin 152 can be adapted to be disposed within the segmented pin bore 134, pivotally connecting the first link 130 and the second link 132 to one another.

FIG. 5A illustrates a partial sectional perspective view of the linkage joint 122 between the first and second links 130, 132. FIG. 6A illustrates a top sectional view of the linkage joint 122 with the section cut across the center of the retention pin 152 in a plane parallel to both the longitudinal and lateral axes 180, 184, as indicated in FIG. 5A. Both FIGS. 5A and 6A show the linkage joint 122 and the first and second links 130, 132 in a relaxed position, in which no significant pulling forces are acting upon either link.

Referring to FIGS. 5A and 6A, as discussed above, the second ends 112, 114 of the respective plates 104, 106 of the first link 130 can include elliptical pin bores 113, 115 and the bushing 118 can include an inner pin bore 119. In the relaxed position, the elliptical pin bores 113,115 can be coaxially aligned with the inner pin bore 119. The elliptical pin bores 113, 115 can be bores with elliptical cross sections. The elliptical pin bores 113, 115 each have a major diameter and a minor diameter, where the major diameter is greater than the minor diameter. The major diameter of the elliptical pin bores 113, 115 can also be greater than a retention pin diameter of the retention pin 152. The major diameter can be substantially aligned with the longitudinal axis 180 and the minor diameter can be substantially aligned with the radial axis 182. As a result, the elliptical pin bores 113, 115 are substantially wider than they are tall, as viewed from the side.

The second ends 112, 114 of the plates 104, 106 of the first link 130 can have elliptical plate bearing surfaces 160, 162 that surround the elliptical pin bores 113, 115. The second ends 112, 114 of the plates 104, 106 can also have at least one plate protrusion 169, 171 that protrudes from one of the elliptical plate bearing surfaces 160, 162. In the embodiment shown in FIGS. 5A and 5B, a plate protrusion 169, 171 protrudes from each of the elliptical plate bearing surfaces 160, 162. Embodiments with a single plate protrusion on only one of the plate bearing surfaces are contemplated, as well as embodiments having multiple plate protrusions on each elliptical plate bearing surface. The bushing 118 can have a smooth interior bushing surface 121 surrounding the inner pin bore 119.

The first ends 108, 110 of the second link 132 can include a pair of coaxially aligned bushing bores 109, 111 through the respective plates 104, 106. The opposite ends 126, 128 of the bushing 118 are adapted to fit within the respective bushing bores 109, 111. The first ends 108, 110 of the second link 132 can fit into the cutout 116 between the second ends 112, 114 of the first link 130 such that the elliptical pin bores 113, 115 can be substantially aligned with the bushing bores 109, 111 and the inner pin bore 119 of the bushing 118. The elliptical pin bores 113, 115 of the second ends 112, 114 of the first link 130 and the inner pin bore 119 of the second link can be substantially aligned adjacent one another to form the segmented pin bore 134 through the entire linkage joint 122. Each end of the segmented pin bore 134 terminates at external surfaces 136, 138 of the second ends 112, 114 of the first link 130.

The ends 126, 128 of the bushing 118 can be press fit into the respective bushing bores 109, 111 to form an interference fit with the respective plates 104, 106. In other embodiments, however, the bushing 118 can be connected to the plates 104, 106 of the second link 132 by adhesive, welding, or any other suitable connection method. In some embodiments, the bushing bore 118 can be integrally formed with the second link 130. In such embodiments, the pair of plates 104, 106 of the second link 132 and the bushing 118 are a single part, with the inner pin bore formed through the bushing and both first ends 108, 110 of each plate.

When the retention pin 152 is disposed within the segmented pin bore 134, each of the end portions 163, 165 of the cylindrical bearing surface 153 can be adjacent one of the elliptical plate bearing surfaces 160, 162 and the body portion 167 of the cylindrical bearing surface can be adjacent the interior bushing surface 121. When the first and second links 130, 132 are in the relaxed position, as illustrated in FIGS. 5A and 6A, the plate protrusions 169, 171 may not engage the pin depressions 155, 157 of the retention pin 152. In such a relaxed position, the retention pin 152 can be inserted and removed from the segmented pin bore 134, connecting or disconnecting the first link 130 and the second link 132 and their respective pairs of plates 104, 106.

Figure 5B:
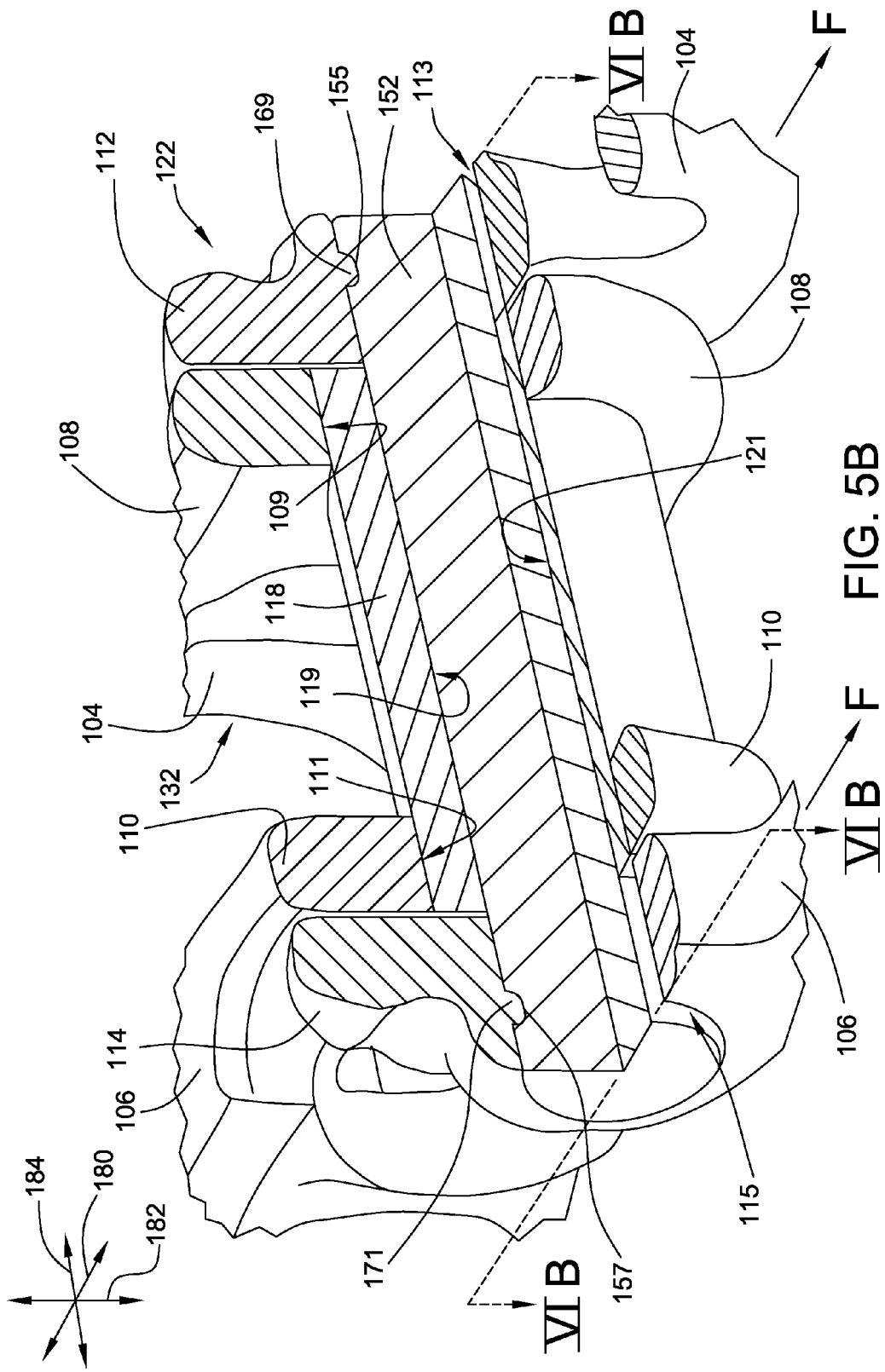
FIG. 5B is a partial sectional perspective view of the linkage joint of FIG. 4 in a tensioned position.
Figure 6A:
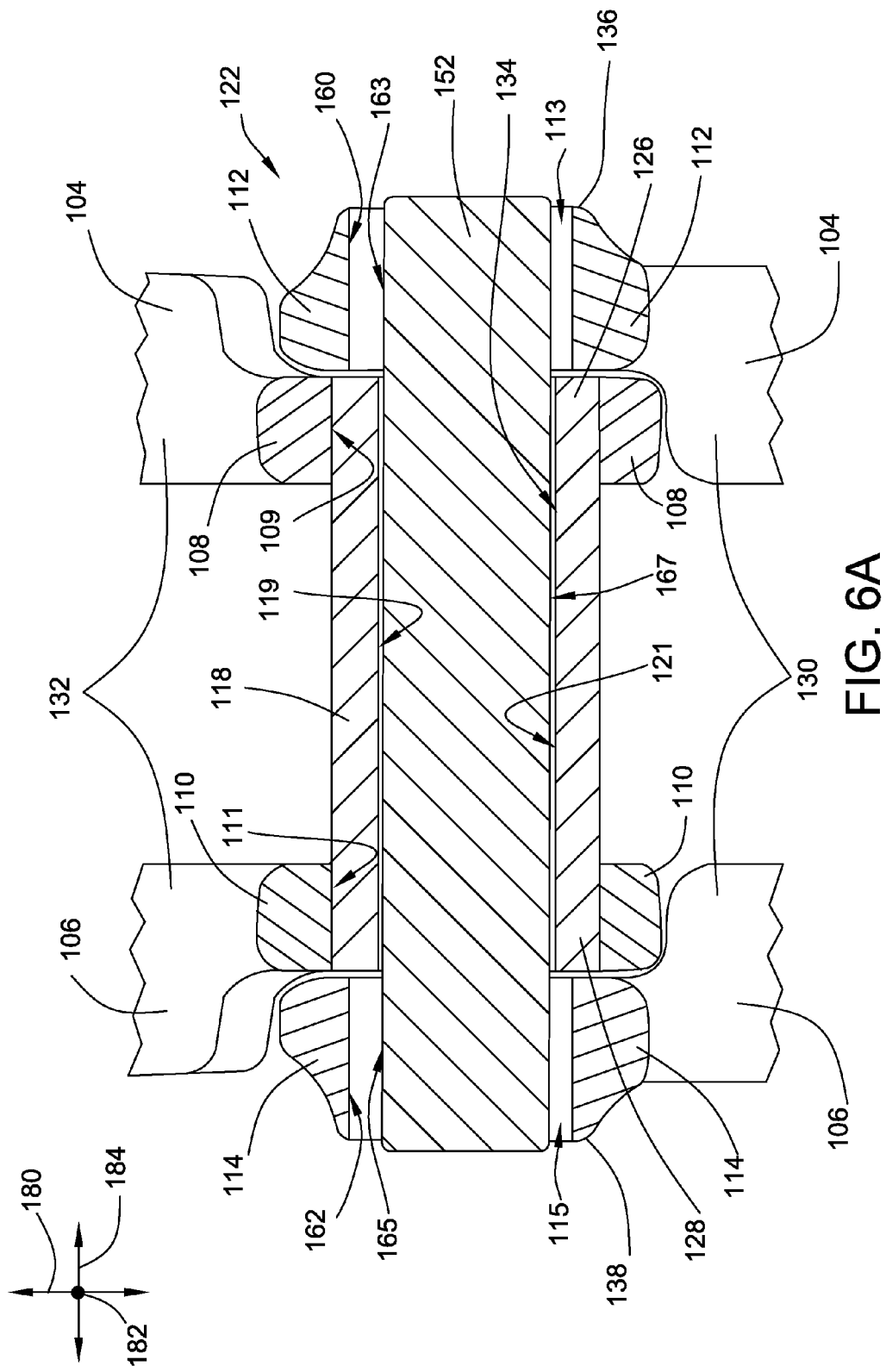
FIG. 6A is a cross sectional top view of the linkage joint of FIG. 4 in a relaxed position.
Figure 6B:
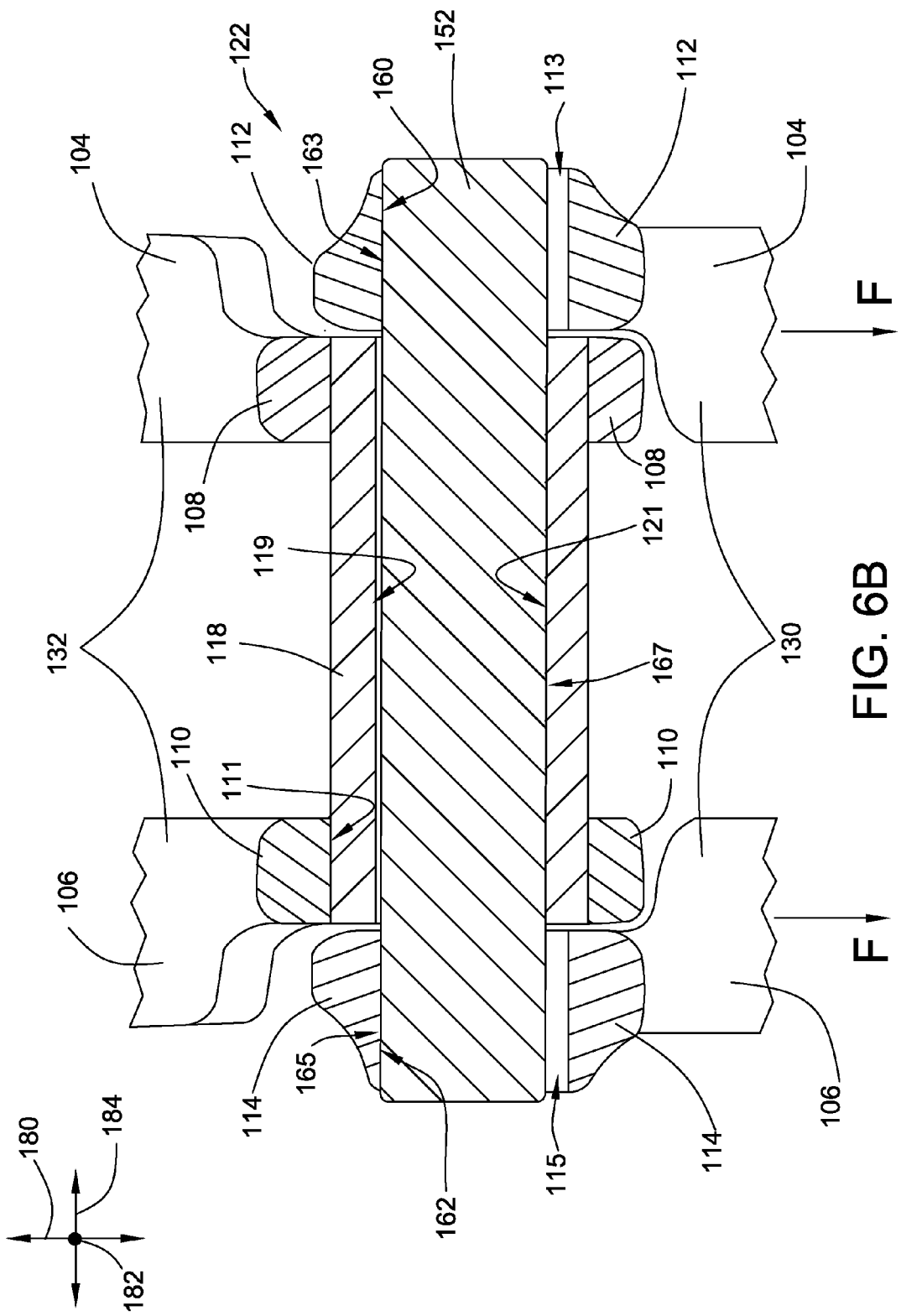
FIG. 6B is a cross sectional top view of the linkage joint in FIG. 4 in a tensioned position.

FIG. 5B illustrates another partial sectional perspective view of the linkage joint 122 between the first and second links 130, 132. FIG. 6B illustrates a top sectional view of the linkage joint 122 with the section cut across the center of the retention pin 152 in a plane parallel to both the longitudinal and lateral axes 180, 184, as indicated in FIG. 5B. Both FIGS. 5B and 6B show the linkage joint 122 and the first and second links 130, 132 in a tensioned position, in which a force F acts upon at least the first link along the longitudinal axis 180 in a direction substantially away from the second link. In the drawings, the force F is represented by an arrow pointing along the longitudinal axis 180 away from the second link. In some embodiments, the first or second links 130, 132 can also be placed in the tensioned position when a force is applied to the second link in a direction away from the first link, or if a force was applied to both the first and second links simultaneously in opposite directions along the longitudinal axis 180.

In the tensioned position, the elliptical plate bearing surfaces 160, 162 can press against the end portions 163, 165 of the cylindrical bearing surface 153 in a first direction along the longitudinal axis 180. The first direction is a direction along the longitudinal axis 180 away from the second link 132. In the tensioned position, the interior bushing surface 121 can press against the body portion 167 of the cylindrical bearing surface 153 in a second direction opposite the first direction. As the links 130, 132 move from the relaxed position to the tensioned position, the plate protrusions 169, 171 that protrude from at least one of the elliptical plate bearing surfaces 160, 162 engage the pin depressions 155, 157 in the cylindrical bearing surface 153. In the tensioned position, the elliptical pin bores 113, 115 may not be coaxially aligned with the inner pin bore 119, and the plate protrusions 169, 171 can be disposed within the pin depressions 155, 157 to limit axial movement of the retention pin 152 relative to the first and second links 130, 132 and their respective pairs of plates 104, 106. It is also contemplated that, in certain embodiments, the second ends of the plates can have plate depressions in the elliptical plate bearing surfaces, and the cylindrical bearing surface can have at least one bearing protrusion. In such an embodiment, the bearing protrusion can engage the plate depression in the tensioned position to limit axial movement of the retention pin along the radial axis.

Figure 7A:
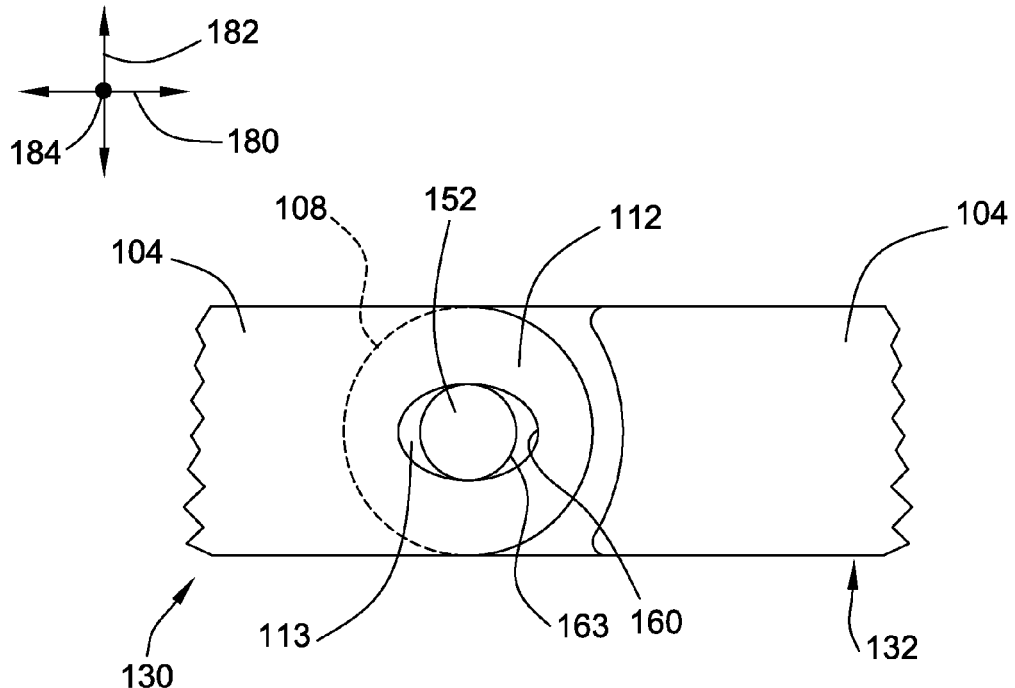
FIG. 7A is a side view showing certain hidden features of the linkage joint of FIG. 4 in a relaxed position.
Figure 7B:
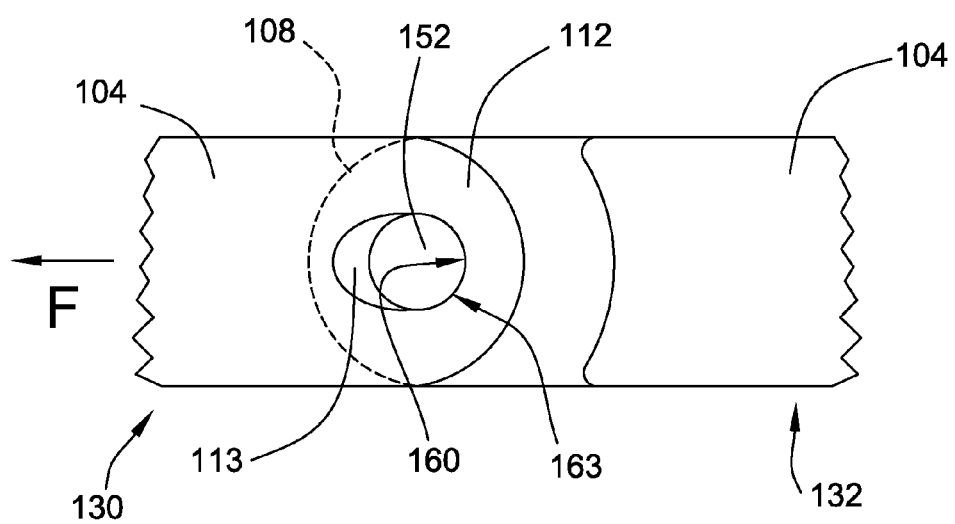
FIG. 7B is a side view showing certain hidden features of the linkage joint of FIG. 4 in a tensioned position.

As best shown in FIG. 6B, in reaching the tensioned position, the elliptical shape of the elliptical pin bores 113, 115 accommodates at least a slight movement of the first link 130 with respect to the second link 132 along the longitudinal axis 180 such that the elliptical pin bores are not coaxially aligned with the inner pin bore 119 of the bushing 118. As also illustrated in FIGS. 7A and 7B, as the second ends 112, 114 of the plates 104, 106 of the first link 130 move with respect to the second link 132, the retention pin 152 travels along the major diameter of the elliptical pin bores 113, 115 toward the elliptical plate bearing surfaces 160, 162. This relative movement causes the interior bushing surface 121 to press against the cylindrical bearing surface 167 and the elliptical plate bearing surfaces 160, 162 to press against the cylindrical bearing surface in a opposite directions such that the retention pin 152 is clamped within the segmented pin bore 134. In the tensioned position with the plate protrusions 169, 171 engaging the pin depressions 155, 157, the first link 130 is pivotally connected to the second link 132 and the retention pin 152 is limited or prevented from moving in an axial direction along the lateral axis 184.

FIGS. 8-11 illustrate an alternative embodiment of a retention system 250 applied to a linkage joint 222. In the alternative embodiment, the inner pin bore 219 of the bushing 218 has an elliptical shape in aligned relation to the elliptical pin bores 213, 215 of the second ends 212, 214 of the first pair of plates 204, 206 of a linkage joint.

Figure 8:
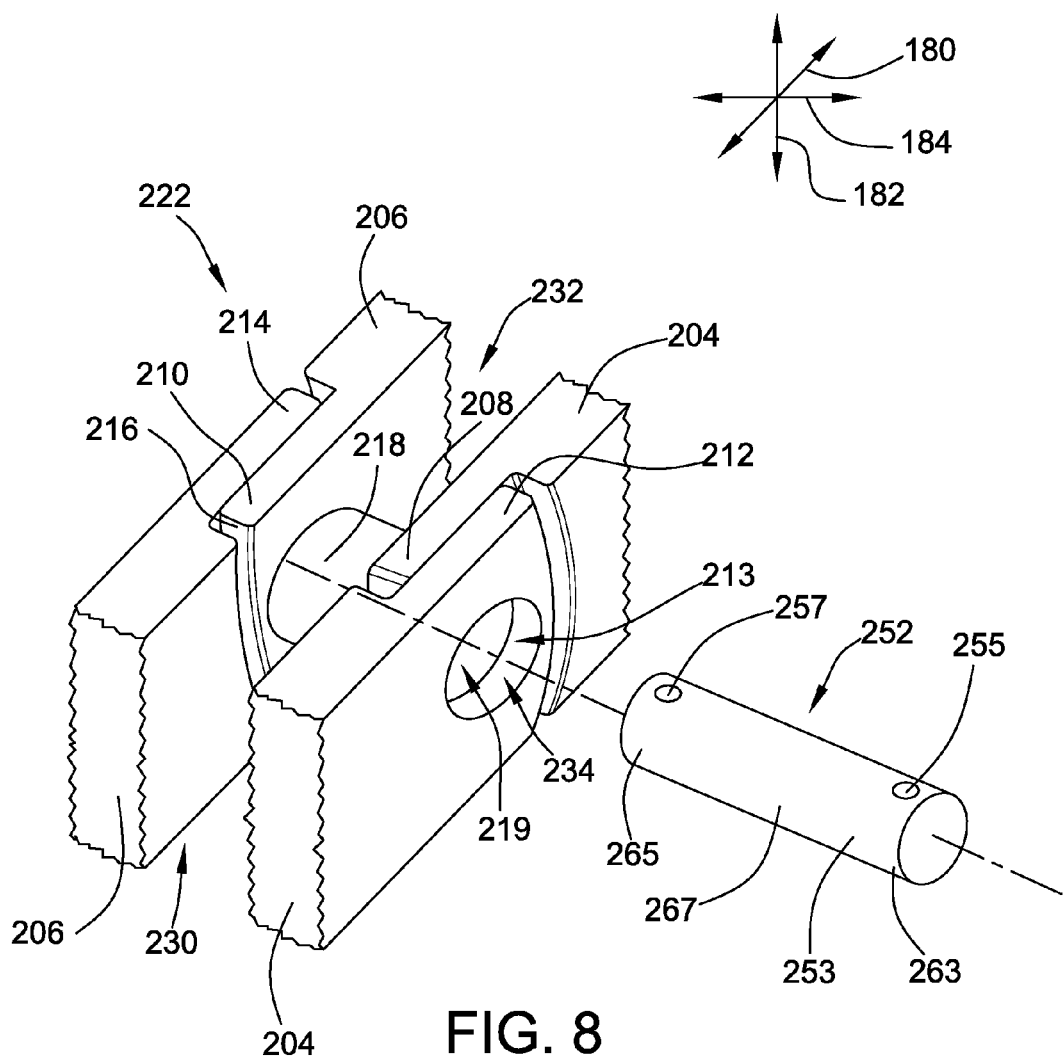
FIG. 8 is a partially exploded view of another embodiment of the linkage joint of a continuous tread utilizing a retention system in accordance with the disclosure.

Referring to FIG. 8, the first link 230 and the second link 232 each have a pair of plates 204, 206. The pair of plates 204, 206 are both in spaced relation to one another and each aligned substantially parallel to a longitudinal axis 180. The longitudinal axis 180 is defined perpendicular to both a lateral axis 184 and a radial axis 182. FIG. 8 illustrates the first ends 208, 210 of the second link 232 and the second ends 212, 214 of the first link 230. The first ends 208, 210 of the second link 232 can be connected by the tubular bushing 218, which can be aligned substantially with the lateral axis 184. The second ends 212, 214 of the first link 230 form the cutout 216 into which the first ends 208, 210 and the tubular bushing 218 of the second link 232 are disposed. The tubular bushing 218 can include an elliptical inner pin bore 219 between opposite ends 226, 228 of the bushing having a substantially elliptical cross section. The elliptical inner pin bore 219 can have a major diameter substantially aligned with the longitudinal axis 180 and a minor diameter substantially aligned with the radial axis 182. The major diameter is larger than the minor diameter. The second ends 212, 214 of the first link 230 can each include an elliptical pin bore 213, 215 through the respective plates 204, 206. Each of the elliptical pin bores 213, 215 can be coaxially aligned with one another across the cutout 216. The first and second link 230, 232 can be aligned such that the elliptical pin bores 213, 215 coaxially align with the elliptical inner pin bore 219 to form a segmented pin bore 234 through the linkage joint 222.

The retention pin 252 can have a cylindrical bearing surface 253 and pin depressions 255, 257 in the cylindrical bearing surface on either end of the retention pin. The pin depressions 255, 257 can extend from the cylindrical bearing surface partially into the retention pin 252. In some embodiments, the cylindrical bearing surface 253 of the retention pin 252 can be a smooth surface. The cylindrical bearing surface 253 can have end portions 263, 265 adjacent either end of the retention pin 252. The cylindrical bearing surface 253 can also have a body portion 267 between the two end portions 263, 265. The retention pin 252 can be adapted to be disposed within the segmented pin bore 234, pivotally connecting the first link 230 and the second link 232 to one another.

Figure 9A:
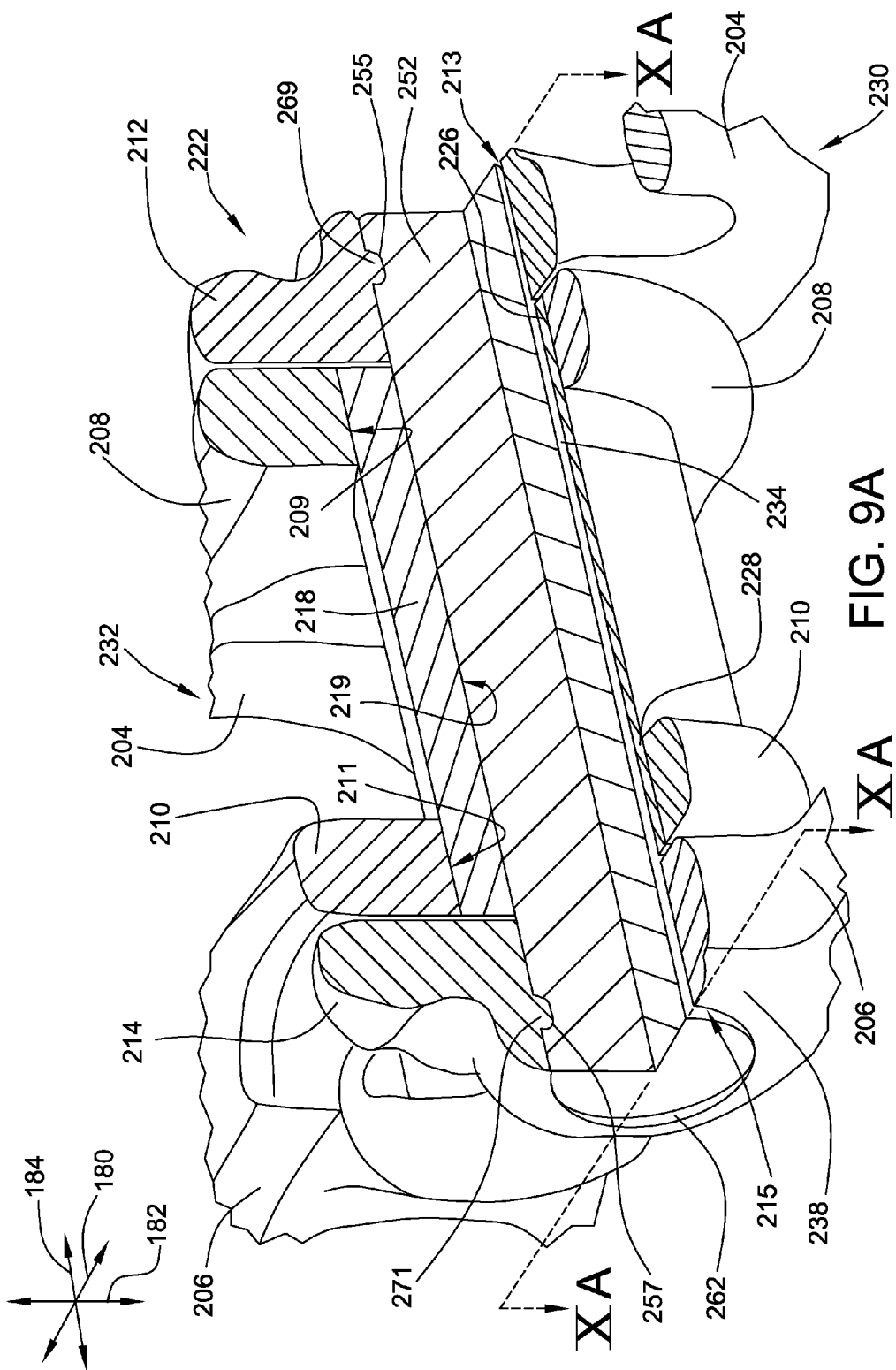
FIG. 9A is a partial sectional perspective view of the linkage joint of FIG. 8 in a relaxed position.
Figure 10A:
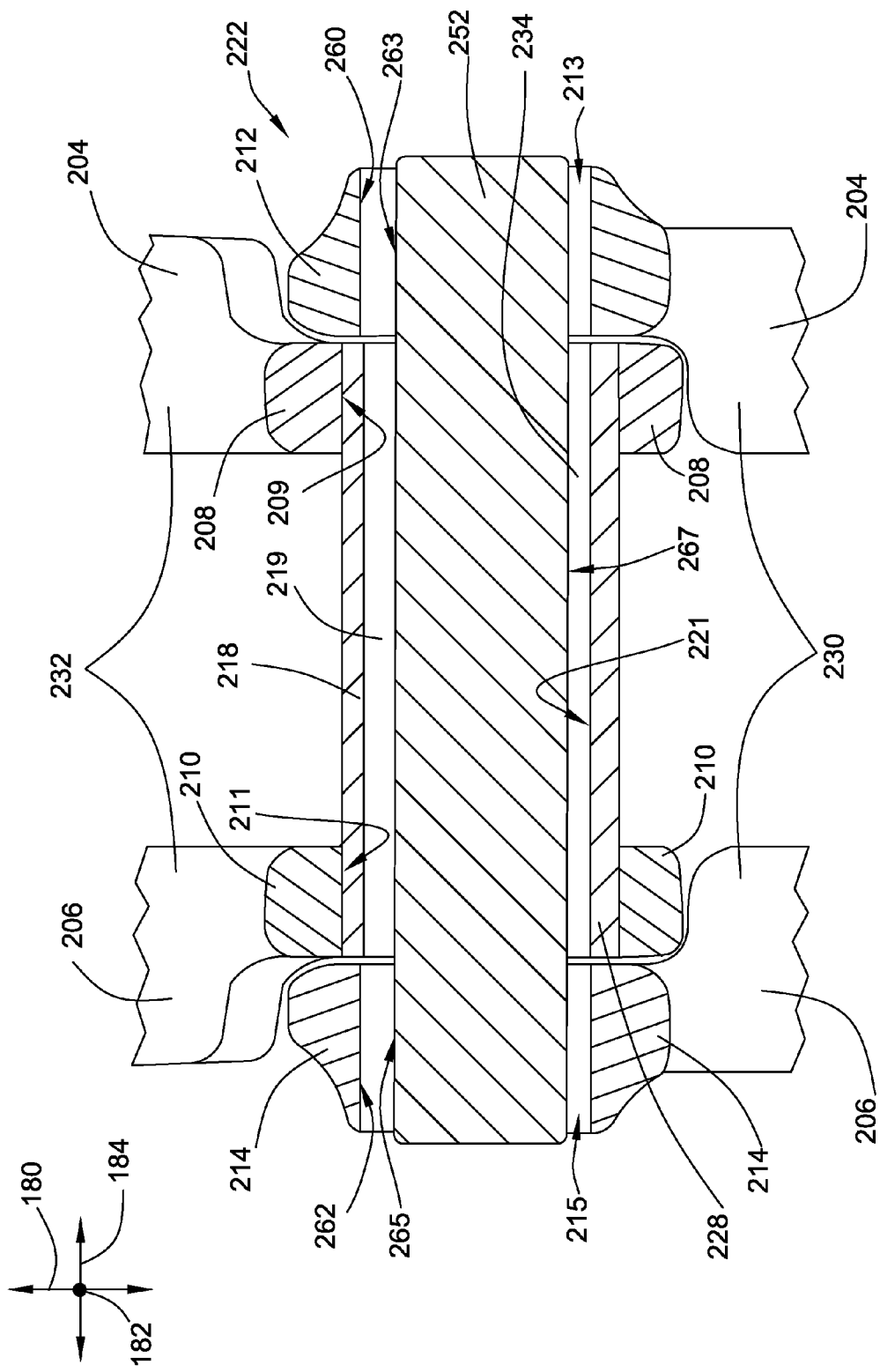
FIG. 10A is a cross sectional top view of the linkage joint of FIG. 8 in a relaxed position.

FIG. 9A illustrates a partial sectional perspective view of the linkage joint 222 between the first and second links 230, 232. FIG. 10A illustrates a top sectional view of the linkage joint 222 with the section cut across the center of the retention pin 252 in a plane parallel to both the longitudinal and lateral axes 180, 184, as indicated in FIG. 9A. Both FIGS. 9A and 10A show the linkage joint 222 and the first and second links 230, 232 in a relaxed position, in which no forces are acting upon either link along the longitudinal axis 180.

Referring to FIGS. 9A and 10A, the second ends 212, 214 of the respective plates 204, 206 of the first link 230 can include elliptical pin bores 213, 215 and the bushing 218 can include an elliptical inner pin bore 219 therethrough. In the relaxed position, the elliptical pin bores 213, 215 can be coaxially aligned with the inner pin bore 219. The elliptical pin bores 213, 215 can be bores with elliptical cross sections. The elliptical pin bores 213, 215 each have a major diameter and a minor diameter, where the major diameter is greater than the minor diameter. The major diameter of the elliptical pin bores 213, 215 can also be greater than a retention pin diameter of the retention pin 252. The major diameter can be substantially aligned with the longitudinal axis 180 and the minor diameter can be substantially aligned with the radial axis 182. As a result, the elliptical pin bores 213, 215 are substantially wider than they are tall, as viewed from the side.

The second ends 212, 214 of the plates 204, 206 of the first link 230 can have elliptical plate bearing surfaces 260, 262 that surround the elliptical pin bores 213, 215. The second ends 212, 214 of the plates 204, 206 can also have at least one plate protrusion 269, 271 that protrudes from one of the elliptical plate bearing surfaces 260, 262. In the embodiment shown in FIGS. 9A and 9B, a plate protrusion 269, 271 protrudes from each of the elliptical plate bearing surfaces 260, 262. Embodiments with a single plate protrusion on only one of the plate bearing surfaces are contemplated, as well as embodiments having multiple plate protrusions on each elliptical plate bearing surface. The bushing 218 can have a smooth interior bushing surface 221 surrounding the elliptical inner pin bore 219.

The first ends 208, 210 of the second link 232 can include a pair of coaxially aligned bushing bores 209, 211 through the respective plates 204, 206. The opposite ends 226, 228 of the bushing 218 are adapted to fit within the respective bushing bores 209, 211. The first ends 208, 210 of the second link 232 can fit into the cutout 216 between the second ends 212, 214 of the first link 230 such that the elliptical pin bores 213, 215 can be coaxially aligned with the bushing bores 209, 211 and the elliptical inner pin bore 219 of the bushing 218. The elliptical pin bores 213, 215 of the second ends 212, 214 of the first link 230 and the elliptical inner pin bore 219 of the second link can be aligned adjacent one another to form the segmented pin bore 234 through the entire linkage joint 222. Each end of the segmented pin bore 234 terminates at external surfaces 236, 238 of the second ends 212, 214 of the first link 230.

The ends 226, 228 of the bushing 218 can be press fit into the respective bushing bores 209, 211 to form an interference fit with the respective plates 204, 206. In other embodiments, however, the bushing 218 can be connected to the plates 204, 206 of the second link 232 by adhesive, welding, or any other suitable connection method. In some embodiments, the bushing bore 218 can be integrally formed with the second link 230. In such embodiments, the pair of plates 204, 206 of the second link 232 and the bushing 218 are a single part, with the elliptical inner pin bore formed through the bushing and both first ends 208, 210 of each plate.

When the retention pin 252 is disposed within the segmented pin bore 234, each of the end portions 263, 265 of the cylindrical bearing surface 253 can be adjacent one of the elliptical plate bearing surfaces 260, 262 and the body portion 267 of the cylindrical bearing surface can be adjacent the interior bushing surface 221. When the first and second links 230, 232 are in the relaxed position, as illustrated in FIGS. 9A and 10A, the plate protrusions 269, 271 may not engage the pin depressions 255, 257 of the retention pin 252. In such a relaxed position, the retention pin 252 can be inserted and removed from the segmented pin bore 234, connecting or disconnecting the first link 230 and the second link 232 and their respective pairs of plates 204, 206.

Figure 9B:
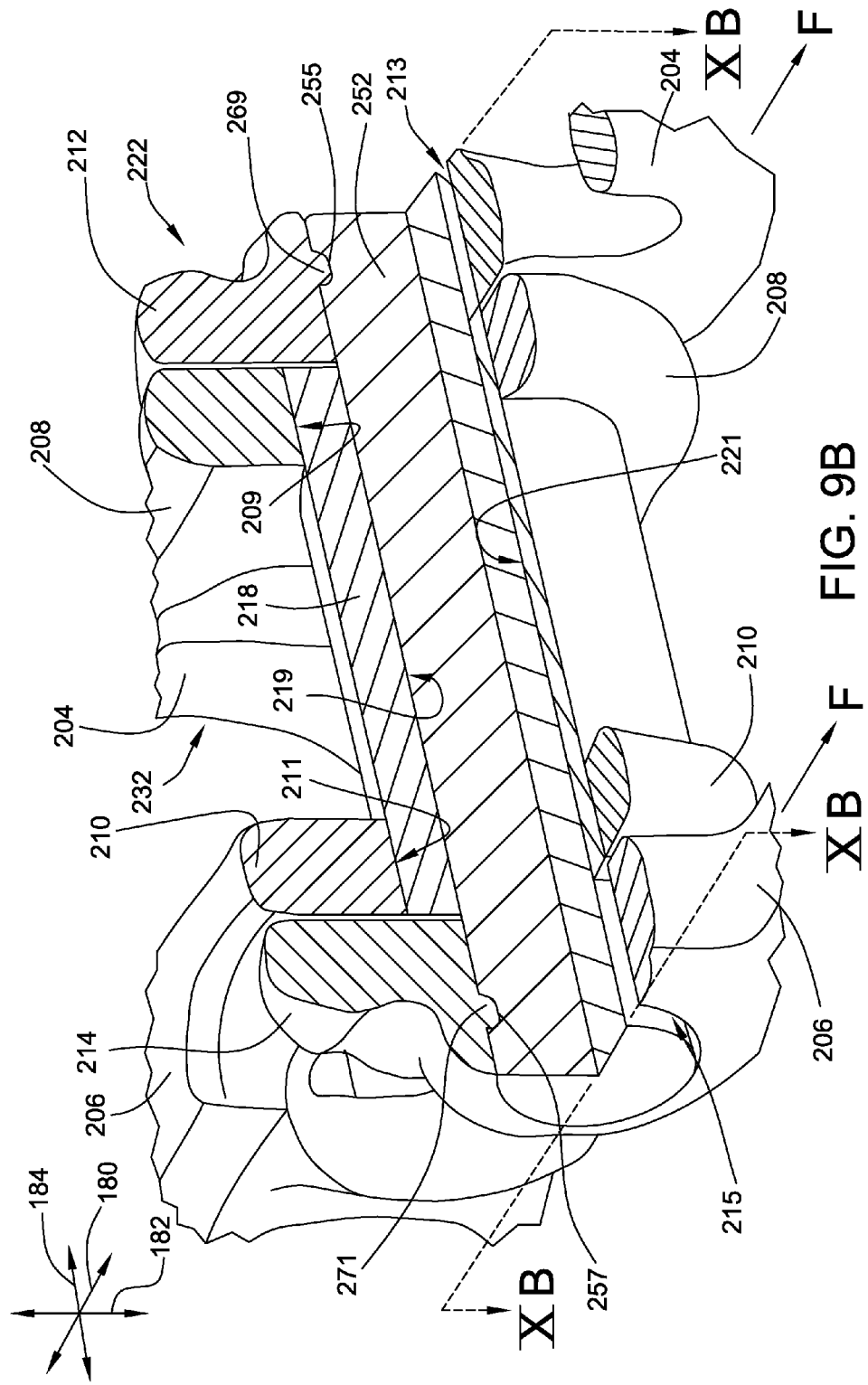
FIG. 9B is a partial sectional perspective view of the linkage joint of FIG. 8 in a tensioned position.
Figure 10B:
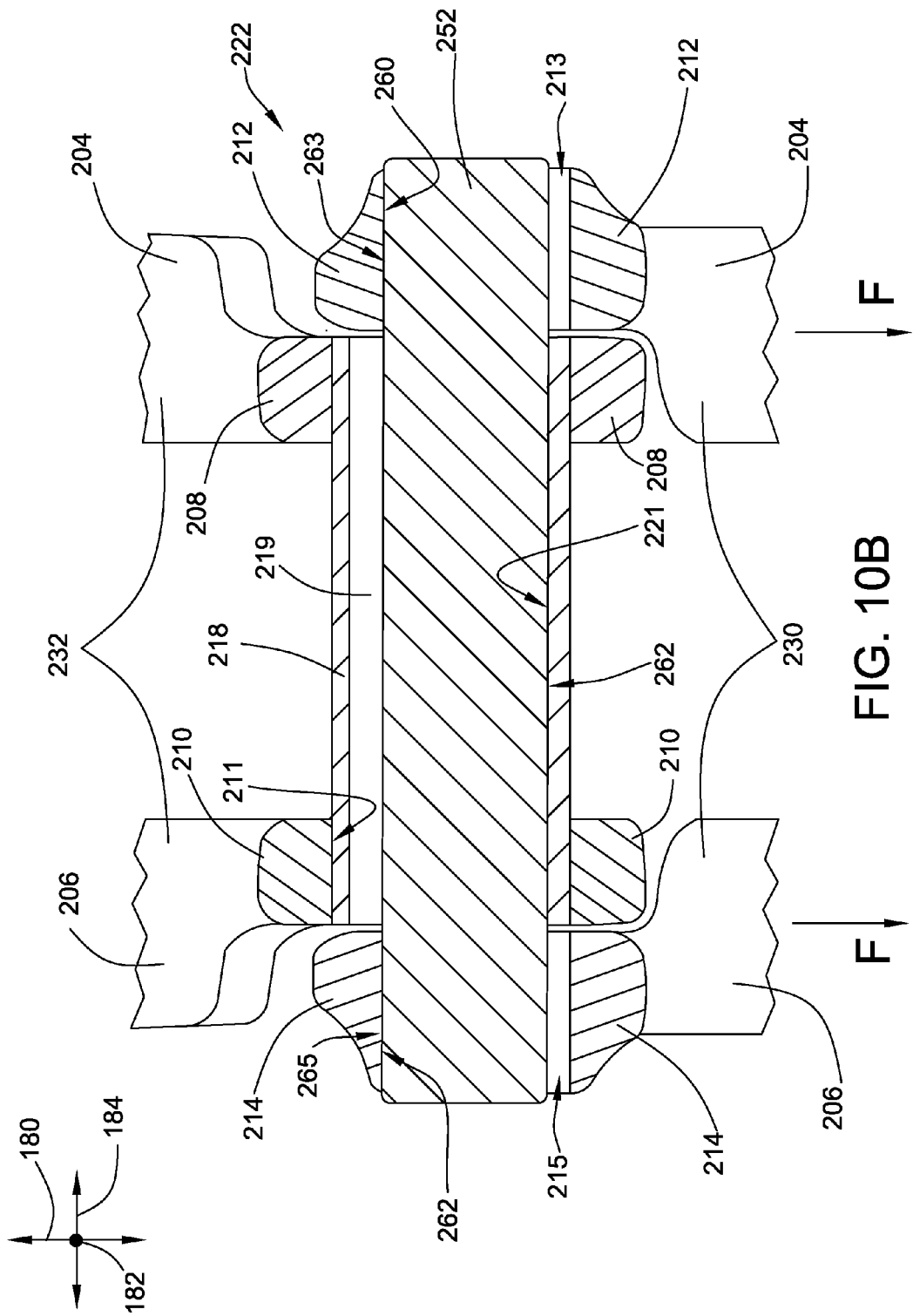
FIG. 10B is a cross sectional top view of the linkage joint in FIG. 4 in a tensioned position.

FIG. 9B illustrates another partial sectional perspective view of the linkage joint 222 between the first and second links 230, 232. FIG. 10B illustrates a top sectional view of the linkage joint 222 with the section cut across the center of the retention pin 252 in a plane parallel to both the longitudinal and lateral axes 180, 184, as indicated in FIG. 9B. Both FIGS. 9B and 10B show the linkage joint 222 and the first and second links 230, 232 in a tensioned position, in which a force F acts upon at least the first link along the longitudinal axis 180 in a direction substantially away from the second link. In some embodiments, the first or second links 230, 232 can also be placed in the tensioned position when a force is applied to the second link in a direction away from the first link, or if a force was applied to both the first and second links simultaneously in opposite directions along the longitudinal axis 180.

In the tensioned position, the elliptical plate bearing surfaces 260, 262 can press against the end portions 263, 165 of the cylindrical bearing surface 253 in a first direction along the longitudinal axis 180. The first direction is a direction along the longitudinal axis 180 away from the second link 232. In the tensioned position, the interior bushing surface 221 can press against the body portion 267 of the cylindrical bearing surface 253 in a second direction opposite the first direction. As the links 230, 232 move from the relaxed position to the tensioned position, the plate protrusions 269, 271 that protrudes from at least one of the elliptical plate bearing surfaces 260, 262 engage the pin depressions 255, 257 in the cylindrical bearing surface 253. In the tensioned position, the elliptical pin bores 213, 215 may not be coaxially aligned with the inner pin bore 219, and the plate protrusions 269, 271 can be disposed within the pin depressions 255, 257 and limit axial movement of the retention pin 252 relative to the first and second links 230, 232 and their respective pairs of plates 204, 206.

Figure 11A:
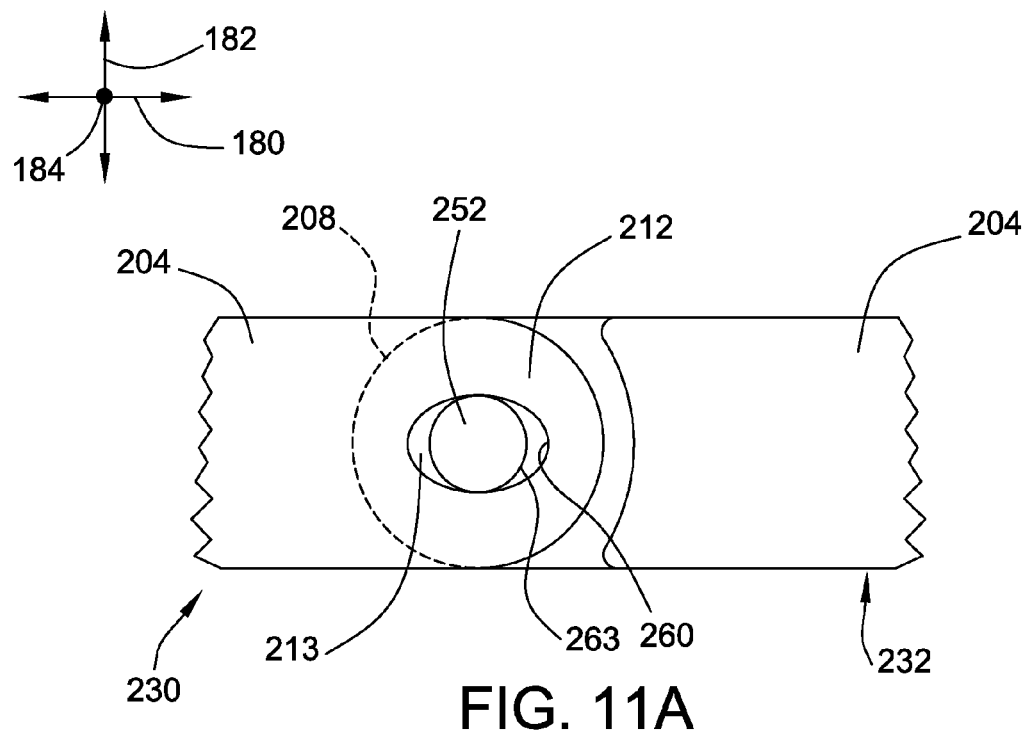
FIG. 11A is a side view showing certain hidden features of the linkage joint of FIG. 8 in a relaxed position.
Figure 11B:
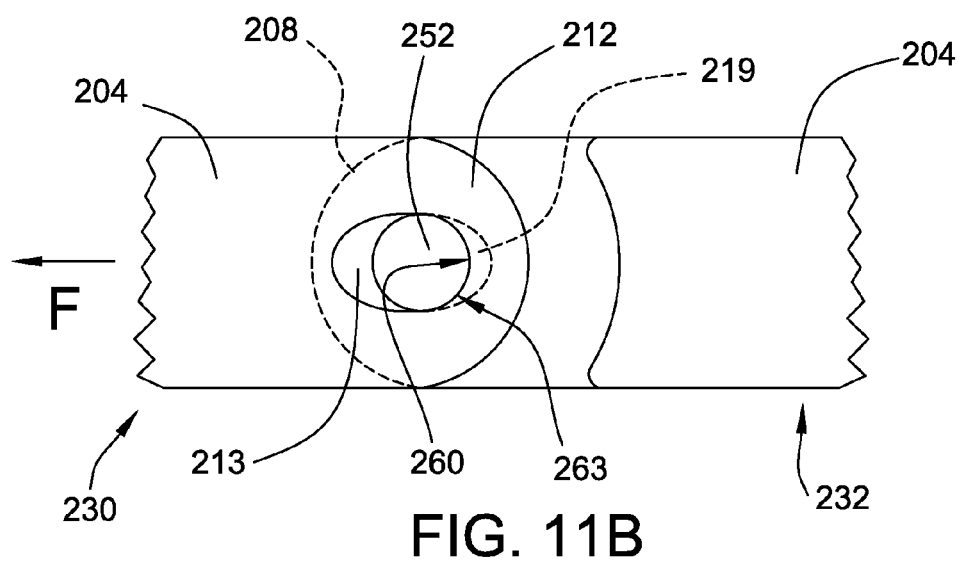
FIG. 11B is a side view showing certain hidden features of the linkage joint of FIG. 8 in a tensioned position.

As best shown in FIG. 10B, in reaching the tensioned position, the elliptical shape of the elliptical pin bores 213, 215 accommodates at least a slight movement of the first link 230 with respect to the second link 232 along the longitudinal axis 180 such that the elliptical pin bores are not coaxially aligned with the elliptical inner pin bore 219 of the bushing 218. As also illustrated in FIGS. 11A and 11B, as the second ends 212, 214 of the plates 204, 206 of the first link 230 move with respect to the second link 232, the retention pin 252 travels along the major diameter of the elliptical pin bores 213, 215 toward the elliptical plate bearing surfaces 260, 262. This relative movement causes the interior bushing surface 221 to press against the cylindrical bearing surface 267 and the elliptical plate bearing surfaces 260, 262 to press against the cylindrical bearing surface in a opposite directions such that the retention pin 252 is clamped within the segmented pin bore 234. In the tensioned position with the plate protrusions 269, 271 engaging the pin depressions 255, 257, the first link 230 is pivotally connected to the second link 232 and the retention pin 252 is limited or prevented from moving in an axial direction along the lateral axis 184.

INDUSTRIAL APPLICABILITY

The industrial application of the retention system as described herein should be readily appreciated from the foregoing discussion. The present disclosure can be applicable to any machine utilizing a track-type continuous tread for machine movement. In machines used for such applications, the links and retaining mechanisms of the continuous tread are exposed to rugged environmental conditions and vulnerable to damage.

The present disclosure, therefore, can be applicable to many different machines and environments. One exemplary use of the retention system of this disclosure can be in rugged excavation applications in which the excavating machine runs for protracted time periods with little downtime where tread linkages will require periodic maintenance in the field. In such applications, reducing machine downtime for maintenance can translate into higher machine work efficiency and lower costs. The elliptical pin retention system described herein features a retention pin that is recessing into a bore through a linkage joint. The retention pin is, thus, protected from exposure to damaging impacts during machine operation. The retention system additionally provides machine operators or maintenance personnel the ability to quickly and easily remove the retention pin from the continuous tread for any needed repairs or replacements. The maintenance personnel can simply release the force on the linkage and then manually remove the retention pin from the linkage joint. The disclosed retention system allows the maintenance personnel the ability to perform repairs in the field without heavy machinery or equipment normally only available off-site. As a result, machine downtime can be reduced and work efficiency increased.

One method of retaining the adjacent links in a continuous tread in accordance with the disclosure includes providing a first link having a first pair of plates in spaced relation to one another and having corresponding first ends and second ends. The method also can include aligning each plate of the first link substantially parallel to a longitudinal axis and forming elliptical pin bores through each of the second ends of the first link in aligned relation to one another. The second ends of the first link can form elliptical plate bearing surfaces surrounding the elliptical pin bores. The elliptical pin bores can each have a major diameter that is greater than a minor diameter. The major diameter can be aligned substantially parallel to the longitudinal axis. The method can include providing a second link that have a second pair of plates in spaced relation to one another and that have corresponding first and second ends. The method can include forming bushing bores through the first ends of the second link in aligned relation to one another. The method can include inserting each of opposite ends of a tubular bushing into the bushing bores so as to connect the first ends of the second link to one another, and forming an inner pin bore between the two opposite ends of the tubular bushing. The tubular bushing can form an interior bushing surface surrounding the inner pin bore. The method can include disposing the second link adjacent the first link such that the first ends of the second link are disposed between the second ends of the first link so as to coaxially align the elliptical pin bores with the inner pin bore of the tubular bushing. The elliptical pin bores and the inner pin bores can form a segmented pin bore. The method can include inserting a retention pin into the segmented pin bore so as to pivotally connect the first and second links. The retention pin can have a cylindrical bearing surface and a retention pin diameter that is less than the major diameters of the elliptical pin bores. The method can also include applying a force upon the first link along the longitudinal axis in a first direction away from the second link so as to cause the elliptical plate bearing surfaces to press against the cylindrical bearing surface in the first direction, and to cause the interior bushing surface to press against the cylindrical bearing surface in a second direction opposite the first direction such that the retention pin is clamped within the segmented pin bore.

It will be appreciated that the foregoing description provides examples of the disclosed system and technique. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context.

Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. A machine with a continuous tread comprising:
a first pair of plates in spaced relation to one another and each aligned substantially parallel to a longitudinal axis, the plates having corresponding first ends and second ends, the second ends including coaxially aligned elliptical pin bores therethrough and having elliptical plate bearing surfaces surrounding the elliptical pin bores, wherein the elliptical pin bores each have a major diameter that is greater than a minor diameter, the major diameter being aligned substantially parallel to the longitudinal axis;
a second pair of plates in spaced relation to one another, the plates having corresponding first and second ends, the first ends including coaxially aligned bushing bores therethrough, wherein the second pair of plates is disposed adjacent the first pair of plates such that the first ends of the second pair of plates are disposed between the second ends of the first pair of plates;
a tubular bushing including an inner pin bore having an elliptical shape between opposite ends of the tubular bushing and having an interior bushing surface surrounding the inner pin bore, the ends of the bushing being disposed in the bushing bores of the first end of the second pair of plates to form a segmented pin bore through the inner pin bore and the elliptical pin bores; and
a retention pin disposed in the segmented pin bore to pivotally connect the first pair of plates to the second pair of plates, the retention pin having a cylindrical bearing surface and having a retention pin diameter that is less than the major diameter of the elliptical pin bore;
wherein the first pair of plates has a tensioned position when a force acts upon the first pair of plates along the longitudinal axis in a direction away from the second pair of plates, the elliptical plate bearing surfaces being disposed in abutting relation with end portions of the cylindrical bearing surface when the first pair of plates is in the tensioned position, the interior bushing surface being in abutting relation with a body portion of the cylindrical bearing surface when the first pair of plates is in the tensioned position.

2. The machine of claim 1 further comprising a plate protrusion on one of the elliptical plate bearing surfaces and a pin depression in the cylindrical bearing surface, wherein the plate protrusion engages the pin depression when the first pair of plates is in the tensioned position so as to limit axial movement of the retention pin relative to the first and second pair of plates.

3. The machine of claim 2 wherein the first pair of plates has a relaxed position when the force is not acting upon the first pair of plates, the plate protrusion being disengaged from the pin depression in the cylindrical bearing surface when the first pair of plates is in the relaxed position to allow removal of the retention pin from the segmented pin bore.

4. The machine of claim 1 further comprising a pair of plate protrusions, each plate protrusion on one of the elliptical plate bearing surfaces, and a pair of pin depressions in the cylindrical bearing surface, wherein each plate protrusion engages one of the pin depressions when the first pair of plates is in the tensioned position so as to limit axial movement of the retention pin relative to the first and second pair of plates.

5. The machine of claim 4 wherein the first pair of plates has a relaxed position when the pulling force is not acting upon the first pair of plates, the plate protrusions being disengaged from the pin depressions in the cylindrical bearing surface when the first pair of plates is in the relaxed position to allow removal of the retention pin from the segmented pin bore.

6. The machine of claim 1 further comprising a plate protrusion on one of the elliptical plate bearing surfaces and a pin depression in the cylindrical bearing surface, wherein the plate protrusion engages the pin depression when the first pair of plates is in the tensioned position to limit axial movement of the retention pin relative to the first and second pairs of plates.

7. The machine of claim 1 further comprising a pair of plate protrusions, each plate protrusion on one of the elliptical plate bearing surfaces, and a pair of pin depressions in the cylindrical bearing surface, wherein each plate protrusion engages one of the pin depressions when the first pair of plates is in the tensioned position so as to limit axial movement of the retention pin relative to the first and second pair of plates.

8. A machine with a continuous tread comprising:
a first link including a first pair of plates in spaced relation to one another and each aligned substantially parallel to a longitudinal axis, the first pair of plates having corresponding first ends and second ends, the second ends including coaxially aligned elliptical pin bores surrounded by elliptical plate bearing surfaces, wherein at least one of the elliptical plate bearing surfaces includes a plate protrusion;
a second link including a second pair of plates in spaced relation to one another, the second pair of plates having corresponding first and second ends, the first ends including coaxially aligned bushing bores therethrough, wherein the second link is disposed adjacent the first link such that the first ends of the second link are disposed between the second ends of the first link;
a tubular bushing including an inner pin bore having an elliptical shape between opposite ends of the tubular bushing, the ends of the bushing being disposed in the bushing bores of the first ends of the second link to form a segmented pin bore through the inner pin bore and the elliptical pin bores; and
a retention pin disposed in the segmented pin bore to pivotally connect the first link to the second link, the retention pin having a cylindrical bearing surface that includes a pin depression;
wherein the first and second links have:
a tensioned position when a force acts upon the first link along the longitudinal axis in a direction away from the second link, wherein the elliptical pin bores are not coaxially aligned with the inner pin bore and the plate protrusion and the pin depression are in engaged relation so as to limit axial movement of the retention pin relative to the first and second links, and
a relaxed position when no force acts upon the first link in a direction away from the second link, wherein the elliptical pin bores are coaxially aligned with the inner pin bore and the plate protrusion is disengaged from the pin depression in the relaxed position.

9. The machine of claim 8, wherein the retention pin is removable from the segmented pin bore when the first and second links are in the relaxed position.

10. The machine of claim 8, wherein the first link includes a plate protrusion on each of the elliptical plate bearing surfaces and the retention pin has a pair of pin depressions in the cylindrical bearing surface, the plate protrusions each engaging with one of the pin depressions when the first and second links are in the tensioned position.

11. The machine of claim 8, wherein the elliptical pin bores each have a major diameter that is greater than a minor diameter, the major diameter being aligned substantially parallel to the longitudinal axis.

12. The machine of claim 11, wherein the retention pin has a retention pin diameter that is less than the major diameter of the elliptical pin bore.

13. The machine of claim 8, wherein the tubular bushing includes an interior bushing surface surrounding the inner pin bore, and wherein the elliptical plate bearing surfaces are disposed in abutting relation with end portions of the cylindrical bearing surface when the first and second links are in the tensioned position, the interior bushing surface being in abutting relation with a body portion of the cylindrical bearing surface when the first and second links are in the tensioned position.

14. A continuous tread for a machine, the tread comprising:
a first pair of plates in spaced relation to one another and each aligned substantially parallel to a longitudinal axis, the plates having corresponding first ends and second ends, the second ends including coaxially aligned elliptical pin bores therethrough and having elliptical plate bearing surfaces surrounding the elliptical pin bores, wherein the elliptical pin bores each have a major diameter that is greater than a minor diameter, the major diameter being aligned substantially parallel to the longitudinal axis;
a second pair of plates in spaced relation to one another, the plates having corresponding first and second ends, the first ends including coaxially aligned bushing bores therethrough, wherein the second pair of plates is disposed adjacent the first pair of plates such that the first ends of the second pair of plates are disposed between the second ends of the first pair of plates;
a tubular bushing including an inner pin bore having an elliptical shape between opposite ends of the tubular bushing and having an interior bushing surface surrounding the inner pin bore, the ends of the bushing being disposed in the bushing bores of the first end of the second pair of plates to form a segmented pin bore through the inner pin bore and the elliptical pin bores; and
a retention pin disposed in the segmented pin bore so as to pivotally connect the first and second pair of plates, the retention pin having a cylindrical bearing surface and having a retention pin diameter that is less than the major diameter of the elliptical pin bore, the retention pin having a pin depression in the cylindrical bearing surface;
wherein the continuous tread has a tensioned position in which the elliptical plate bearing surfaces press against end portions of the cylindrical bearing surface in a first direction along the longitudinal axis, the interior bushing surface press against a body portion of the cylindrical bearing surface in a second direction opposite the first direction, and a plate protrusion on at least one of the elliptical plate bearing surfaces engages the pin depression in the cylindrical bearing surface so as to limit axial movement of the retention pin relative to the first and second pair of links; and wherein the continuous tread has a relaxed position in which the plate protrusion is disengaged from the pin depression in the cylindrical bearing surface to permit removal of the retention pin from the segmented pin bore.

15. The tread of claim 14, wherein the continuous tread is in the tensioned position when a force acts upon the first pair of plates along the longitudinal axis in a first direction away from the second pair of plates, and the continuous tread is in the relaxed position when the force is not acting upon the first pair of plates.

16. The tread of claim 14, wherein a plate protrusion is on each of the elliptical plate bearing surfaces and the retention pin has a pair of pin depressions in the cylindrical bearing surface, the pair of plate protrusions engaging the pair of pin depressions when the continuous tread is in the tensioned position.

17. The tread of claim 14, wherein a plate protrusion is on each of the elliptical plate bearing surfaces and the retention pin has a pair of pin depressions in the cylindrical bearing surface, the pair of plate protrusions engaging the pair of pin depressions when the continuous tread is in the tensioned position.

* * * * *